3,058,965
NEW ACRYLIC COPOLYMERS AND METHODS FOR PRODUCING SAME

Norman G. Gaylord, Westbury, N.Y., assignor to Interchemical Corporation, New York, N.Y., a corporation of Ohio
No Drawing. Filed Apr. 20, 1959, Ser. No. 807,289
6 Claims. (Cl. 260—89.5)

This invention relates to novel polymeric materials and to coating composition containing these new polymeric materials. More particularly, it relates to permanently thermoplastic resinous copolymers produced by the ester interchange reaction of 2,5-endomethylene-Δ3-tetrahydrobenzyl alcohol also commonly referred to as 2-hydroxymethyl-5-norbornene with a homopolymer or copolymer containing acrylic ester or methacrylic ester monomers.

These new thermoplastic resins are compatible with many conventional thermosetting resins and function as excellent plasticizers when combined with such thermosetting resins. In addition, solutions of our novel thermoplastic resins in volatile organic solvents provide excellent lacquer coatings. 2-hydroxymethyl-5-norbornene which has the following structure

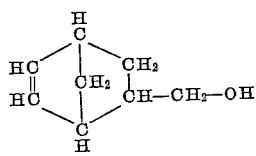

is readily prepared by condensing allyl alcohol with cyclopentadiene (U.S. Patents Nos. 2,596,279 and 2,353,606).

The homopolymer or copolymer reacted with the 2-hydroxymethyl-5-norbornene may be represented as containing the following structural unit:

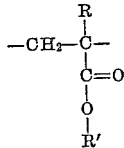

where R is a member of the group consisting of methyl groups and hydrogen and R' is an alkyl group containing 1 to 8 carbon atoms.

The ratios of the reactants is not particularly critical. In fact, the ester interchange reactions have been conducted with ratios of 2-hydroxymethyl-5-norbornene to acrylic ester type copolymer between 1 to 10 and 7 to 10 by weight. The ester interchange reaction is normally catalyzed by an alkoxide of polyvalent metal preferably tetrabutyl titanate or aluminum isopropoxide.

By means of its unique ester interchange reaction, this invention provides a new permanently thermoplastic resin which incorporates an acrylic ester type polymer and 2-hydroxymethyl-5-norbornene.

The existing art does not disclose such a novel permanently thermoplastic resin. U.S. Patent No. 2,838,479 discloses thermosetting resins produced by the addition polymerization of 2,5-endomethylene-Δ3-tetrahydrobenzyl acrylate and butyl acrylate. The resins produced by the addition polymerization method described in said patent do not display the thermoplastic properties of the resins of this invention. Instead, they are thermosetting and set to yield a hard baked coating upon curing. Without any commitment on the theory involved, I believe that this difference is due to a significant difference in structure between the thermoplastic resins of this invention and the thermosetting resins described in the patent.

I believe that the ester interchange reaction of this invention may be shown by the following structural equation:

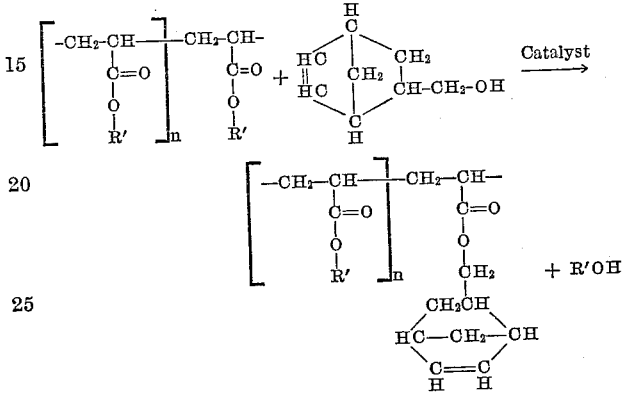

Where R' has the meaning given above and $n$ is a positive integer indicating the number of repeating units. It is to be noted that wherever the 2-hydroxymethyl-5-norbornene is incorporated into the copolymer by ester interchange a pendant norbornene nucleus results. This is not the case with the addition copolymerization reaction described in U. S. Patent No. 2,838,479. In the reaction of this patent, while most of the reacted acrylic ester of 2-hydroxymethyl-5-norbornene does polymerize via the acrylate double bond, thereby resulting in pendant norbornene nuclear similar to those of the resin of this invention, a considerable portion of the acrylic ester polymerizes by means of the norbornene nucleus double bond. The latter results in pendant acrylate groups. Accordingly the addition copolymer of said patent has the following structural formula:

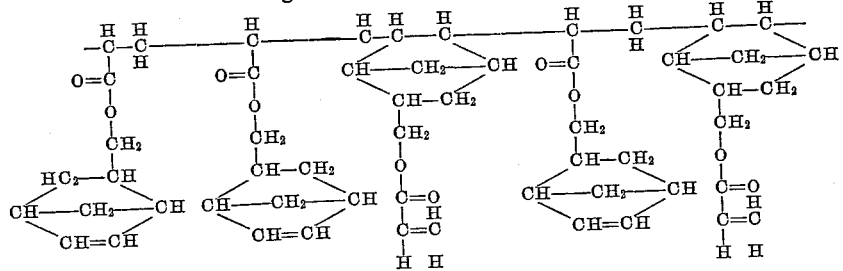

These pendant acrylate groups are substantially responsible for the thermosetting properties of the resins covered by said patent. The setting of said resins upon baking is attributable to cross-linking by means of homopolymerization of the pendant acrylate groups or copolymerization of the pendant acrylate groups with the pendant norbornene groups.

On the other hand, as described above, the novel thermoplastic resins of this invention produced by an ester interchange reaction have no pendant acrylate groups. They accordingly do not undergo any appreciable cross-linking upon heating and remain permanently thermoplastic.

The following examples will serve to illustrate the preferred practice of this invention.

Example 1

To produce an acrylic ester copolymer, a solution of 645 g. (6.45 moles) of methyl methacrylate, 105 g. (.82 moles) of butyl acrylate and 7.5 g. of azobisisobutyronitrile in 875 g. of xylene is added dropwise over a period of 2 hours to 875 g. of xylene at a temperature of 80° C. The mixture is maintained at 80° C. for an additional 8 hours. A solids determination indicates a solid content of 29.2% by weight which represents 97.4% conversion of monomers to copolymer.

237 g. (1.9 moles) of 2-hydroxymethyl-5-norbornene are then added to 2250 g. of the acrylic ester copolymer solution produced. Since this solution has a solids content of 29.2%, it is calculated to contain 675 g. of copolymer. The mixture is heated to 140° C. to remove any water which may be present.

The mixture is then cooled to 60° C. and 13.1 g. of tetrabutyl titanate are added. The mixture is heated to reflux and a distillate comprising a solution of xylene and the methanol produced by the ester interchange reaction is collected by azeotropic distillation. The distillation is carried out at vapor temperatures of 120–127° C. and pot temperatures of 140–145° C. After 90 ml. of distillate are collected, another 13.1 g. of tetrabutyl titanate are added and the remainder of the distillate is collected, making a total of 885 g. of distillate collected. The distillate has a composite refractive index $n_d$ at 30° C. of 1.4840 which indicates that the distillate comprises 93% xylene and 7% methanol. Based upon the distillate weight, a total of 61.9 g. of methanol is calculated to have been collected. This indicates that substantially 1.9 moles of methanol was produced by the ester interchange reaction of 1.9 moles of 2-hydroxymethyl-5-norbornene with the methacrylic copolymer, thereby resulting in the 100% incorporation of the reacted 2-hydroxymethyl-5-norbornene in the copolymer. The resultant thermoplastic resinous copolymer is calculated to have a 3.77:1.9:0.72 molar ratio of methyl methacrylate:2-hydroxymethyl-5-norbornene:methacrylate butyl acrylate. The final copolymer solution has a 46.3% solids content by weight.

The resinous copolymer is found to be permanently thermoplastic. It does not set upon the application of heat.

Example 2

428 g. of 2-hydroxymethyl-5-norbornene are added to 1500 g. of the acrylic ester copolymer solution produced in Example 1. Since this solution has a solids content of 29.2%, it is calculated to contain 450 g. of copolymer. The mixture is then heated to 140° C. to remove water which may be present after which it is cooled to 60° C. 11.8 g. of tetrabutyl titanate are added and the mixture is heated to reflux. A solution of xylene and the methanol produced by the ester interchange reaction is collected by azeotropic distillation. After about 60 ml. of distillate have been collected, the refluxing mixture is cooled to 60° C. and another 11.8 g. of tetrabutyl titanate are added. The mixture is again heated to reflux and another 175 g. of distillate are collected. During this azeotropic distillation, the temperature of the mixture varied between 130° to 140° C. The product has a solids content of 42% by weight. The viscosity is 148+ poises.

The resinous copolymer produced is found to be permanently thermoplastic. It does not set upon the application of heat.

Example 3

100 g. of methyl acrylate and 1 g. of azobisisobutyronitrile are added dropwise over a period of 1½ hours to 400 g. of xylene at a temperature of 80° C. The mixture is maintained at 80° C. for an additional 19 hours. To 214 g. of the copolymer solution produced, are added 21 g. of 2-hydroxymethyl-5-norbornene. The mixture is then heated to boil off any water which may be present.

The mixture is cooled to 60° C. and 1.3 grams of tetrabutyl titanate are added. The mixture is heated to reflux and a distillate comprising a solution of xylene and the methanol produced by the ester interchange reaction is distilled off by azeotropic distillation. After refluxing for 3 hours another 1.3 grams of tetrabutyl titanate are added. Refluxing is continued for an additional 3 hours until no further distillate comes over. The distillation is conducted at temperatures between 124° and 137° C. The remaining polymer solution has a solids content of 23.7% by weight. The reaction product does not set after heating at 177° C. for ½ hour. It is thermoplastic.

While for the purposes of describing the present invention, I have referred to copolymers of 2-hydroxymethyl-5-norbornene, it will be understood that related homologs can be readily used. Homologs and derivatives may be readily prepared by condensing allyl alcohol with alkyl substituted cyclopentadienes (U.S. Patents No. 2,596,279 and No. 2,353,606) and compounds containing two alcoholic hydroxyl groups can be prepared by condensing an unsaturated diol, such as butenediol with cyclopentadiene.

While there have been described what are considered to be the preferred embodiments of this invention, it will be understood that the practice of this invention is not limited to the resins described in the specific examples but that various modifications may be made therein without departing from the scope of the invention as it is defined in the appended claims.

I claim:

1. New thermoplastic resins comprising the ester interchange reaction products of 2-hydroxymethyl-5-norbornene and a polyacrylate containing a repeating unit having the following structural formula:

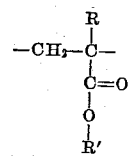

where R is a member of the group consisting of a methyl group and hydrogen, and R' is an alkyl group containing from 1 to 8 carbon atoms in the presence of an alkoxide of a polyvalent metal wherein the metal has a valence of at least 3.

2. The new thermoplastic resin claimed in claim 1 wherein said alkoxide of a polyvalent metal is tetrabutyl titanate.

3. The new thermoplastic resin claimed in claim 1 wherein said repeating unit is the methyl methacrylate monomer.

4. The new thermoplastic resin claimed in claim 1 wherein said repeating unit is the methyl acrylate monomer.

5. A method of preparing thermoplastic resins which comprises heating 2-hydroxymethyl-5-norbornene and a polyacrylate containing a repeating unit having the following structure:

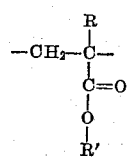

where R is a member of the group consisting of a methyl group and hydrogen, and R' is an alkyl group containing from 1 to 8 carbon atoms in the presence of an alkoxide of polyvalent metal catalyst, wherein the metal has a valence of at least 3.

6. The method of claim 5, wherein said alkoxide of a polyvalent metal is tetrabutyl titanate.

(References on following page)

References Cited in the file of this patent

UNITED STATES PATENTS

| | | |
|---|---|---|
| 2,109,877 | Barrett | Mar. 1, 1938 |
| 2,318,959 | Muskat | May 11, 1943 |
| 2,352,606 | Alder et al. | July 4, 1944 |
| 2,363,044 | Clifford | Nov. 21, 1944 |
| 2,415,453 | Thomas | Feb. 11, 1947 |
| 2,557,136 | Nichols | June 19, 1951 |
| 2,579,079 | Tawney | Dec. 18, 1957 |
| 2,822,348 | Haslam et al. | Feb. 4, 1958 |
| 2,838,479 | Biletch | June 10, 1958 |

FOREIGN PATENTS

| | | |
|---|---|---|
| 487,593 | Great Britain | June 22, 1938 |